United States Patent [19]

Jeal et al.

[11] Patent Number: 4,907,922
[45] Date of Patent: Mar. 13, 1990

[54] SELF-PLUGGING BLIND FASTENER

[75] Inventors: Harvey P. Jeal, Stevenage; Frederick A. Summerlin, Holbeton, both of England

[73] Assignee: Avdel Systems Limited, Hertfordshire, England

[21] Appl. No.: 379,960

[22] Filed: Jul. 14, 1989

[30] Foreign Application Priority Data

Jul. 14, 1988 [GB] United Kingdom ............... 8816758

[51] Int. Cl.$^4$ .................... F16B 13/04; F16B 13/06
[52] U.S. Cl. ........................... 411/43; 411/34; 411/70
[58] Field of Search .................... 411/34–38, 411/43, 69, 70, 39

[56] References Cited

U.S. PATENT DOCUMENTS

| | | | |
|---|---|---|---|
| 3,390,601 | 7/1968 | Summerlin | 411/43 |
| 4,451,189 | 5/1984 | Pratt | 411/43 |
| 4,784,551 | 11/1988 | Kendall | 411/43 |
| 4,844,673 | 7/1989 | Kendall | 411/43 |

Primary Examiner—Neill R. Wilson
Attorney, Agent, or Firm—Oblon, Spivak, McClelland, Maier & Neustadt

[57] ABSTRACT

A self-plugging blind fastener of the type having a tubular, headed, body, and a stem which is pulled and locked relative to the body to set the fastener, has improved locking means provided in the form of a deformable annular locking collar which is disposed on the stem, a locking groove on the plug part of the stem, and an annular recess at the head end of the body provided as an enlargement of the bore. The recess has a generally cylindrical outer region of substantially greater diameter than the main region of the bore, and a tapered inner region in which the diameter of the recess reduces to that of the main region of the bore. The recess can be stepped between the outer and inner regions. The locking collar has a locking portion of small external diameter which seats in the inner region of the recess, and a load-bearing head portion of larger diameter, and more massive, than the locking portion, but which can be forced into the outer region of the recess, causing the locking portion to be urged radially inwardly. The locking portion is supported by the stem until the locking groove comes into register with the recess, after which the collar can be forced further into the recess which guides the locking portion into the locking groove where it meets a reaction face of the groove and then back-fills the groove to abut a locking face. Stop faces on the stem and body ensure that the locking groove registers correctly with the recess. The fastener can be set by a single action tool which pulls the stem and applies reaction force to the collar only.

18 Claims, 3 Drawing Sheets

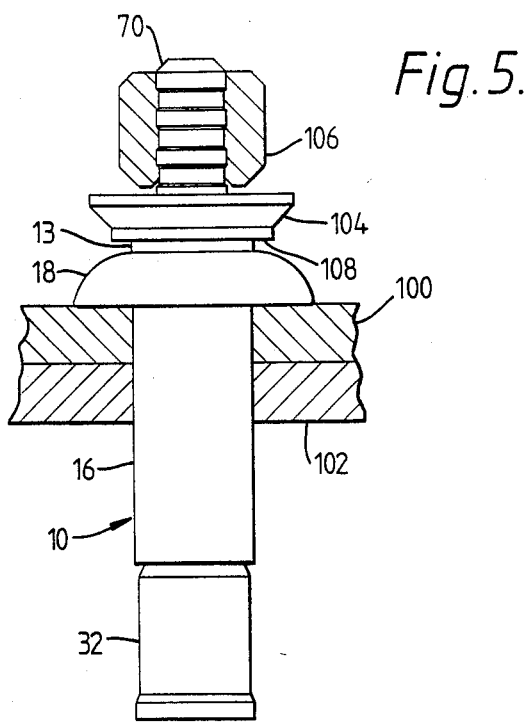
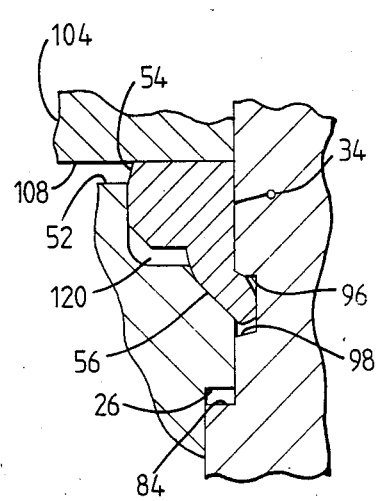
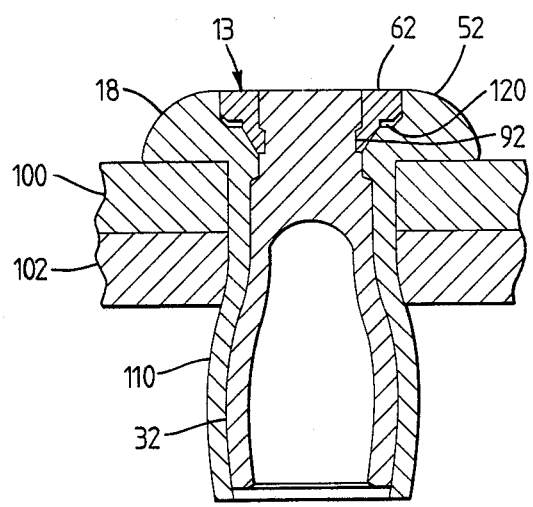

SELF-PLUGGING BLIND FASTENER

This invention relates to a self-plugging blind fastener, and more particularly to a self-plugging blind fastener of the kind in which, during setting of the fastener, a plug part of the fastener is locked within the body of the fastener.

Such blind fasteners are known in a variety of forms, and generally comprise a tubular body having an elongate shank and a preformed, radially enlarged, head at one end of the shank, and an elongated stem which extends through the bore and part of which projects from the head end of the body, the fasteners being set by gripping the projecting part and pulling the stem relative to the body, so as to deform part of the fastener and thereby form a blind head remote from the preformed head, and leave at least a part of the stem locked within the bore in the body of the set fastener, where it will act as a plug to close the bore, and may strengthen the fastener.

Locking the plug part of the stem within the body of the set fastener prevents it from becoming loose or separated from the body. Various locking means have been employed for this purpose in the past, including the provision of an annular locking groove in the plug and a separate deformable collar which is forced to deform and enter the locking groove, while abutting part of the body, and thus lock the plug in position relative to the body. The body may have a recess such as a counterbore at the head end for receiving the deformed collar.

It is also usual, although not essential, to remove the projecting part of the stem from the plug once it has served its purpose of allowing the fastener to be set, and, to facilitate this, the stem may be formed with a breakneck at which the plug and the projecting part will separate when the stem is subjected to a predetermined tension.

Such fasteners are set by means of a tool having an anvil and means for gripping and pulling the projecting part of the stem relative to the body while the body is supported, directly or indirectly, at its head end by the anvil. The tool is also required to cause the locking means to lock the plug within the body.

In order to be suitable for setting any particular type of self-plugging blind fastener having locking means, it is sometimes necessary for the tool to incorporate elaborate features, particularly in the design of the anvil, which render the tool vulnerable to damage or malfunction, and are more expensive to produce. Such elaborate features include the provision of the anvil with a working face having delicate projecting parts, or relatively movable parts.

It is therefore desirable that the fastener should be capable of being set by means of a tool of relatively simple construction.

In addition, there are a number of other requirements which it is desirable that a self-plugging blind fastener should satisfy, and the known fasteners either have not satisfied all these requirements, or have done so in ways which are elaborate, expensive, or otherwise unsatisfactory.

Among these requirements are:
that the amount of force (known as the "pushout force") required to displace the plug from the body of the set fastener should be very high;
that it should be apparent on visual inspection that the plug has been satisfactorily locked in position;
that the preformed head end of the fastener after setting should present a substantially flush surface, free from any protrusion or cavity, and that the forces required to set the fastener should not be exceptionally great.

We have now devised a fastener which is believed to offer advantages over known fasteners of similar type.

According to the present invention, there is provided a self-plugging blind fastener comprising a tubular body, an elongate stem, and an annular locking collar,
the tubular body having an elongate shank and a preformed radially enlarged head at one end of the shank, the stem being disposed within the bore of the tubular body and having a plug part having an annular locking groove, and a tail part which projects from the head end of the body and whereby the plug part can be pulled, and moved relative to the body in the direction from the shank towards the preformed head, to cause the formation of a blind head remote from the preformed head,
the bore of the body being radially enlarged at the head end to provide an annular recess which extends peripherally of the stem and axially into the head from the head end of the body,
the recess having an outer region having a diameter substantially greater than that of the bore, and a tapered inner region in which the diameter of the recess reduces away from the outer region, to a diameter the same as that of the bore,
the fastener having means for arresting the movement of the plug part through the body in the said direction after formation of a blind head,
the annular locking collar being disposed on the projecting tail part of the stem, and having a volume smaller than the combined volumes of the recess and the locking groove, the locking collar comprising a deformable locking portion and a radially enlarged load-bearing head portion, the locking portion having a volume greater than that of the locking groove and being deformable radially inwardly, on being forced into the inner region of the recess, so as to enter the locking groove, the head portion having a volume less than that of the outer region of the recess, and an external diameter greater than that of the locking portion but such as to be capable of entering the outer region of the recess,
the stem having a collar-supporting part between the locking groove and the projecting part, the collar-supporting part fitting closely to the walls of the bores of the body and the collar, and
the angle of taper of the inner region of the recess being sufficiently great to resist, in cooperation with the collar-supporting part of the stem, the entry of at least part of the deformable locking portion into the inner region of the recess when the locking collar is subjected to a force sufficient to move the plug in the said direction while causing the formation of a blind head, but sufficiently small to allow the locking portion to enter more fully into the inner region and to be deformed thereby when the locking collar is subjected to an increasing force after movement of the pug relative to the body has been arrested by the arresting means, the arresting means being arranged to positively arrest the movement of the plug in the said direction as soon as substantially all of the locking groove comes into register with the annular recess, and thus allow the application to the locking collar of an increasing force, whereby the locking collar can be caused to enter more fully into the recess and be deformed thereby so as to enter the locking groove.

Embodiments of the invention will now be described, by way of example, with reference to the accompanying diagrammatic drawings, in which:

FIG. 5 is a view, partly in section, showing the fastener of FIG. 1 located in apertured workpiece members to be fastened, together with parts of a tool to be used for setting the fastener;

FIG. 6 is a fragmentary sectional elevation, on an enlarged scale, showing the fastener in an intermediate stage of installation, and FIG. 7 is a sectional elevation showing the fastener in the fully set condition.

Figure 1:
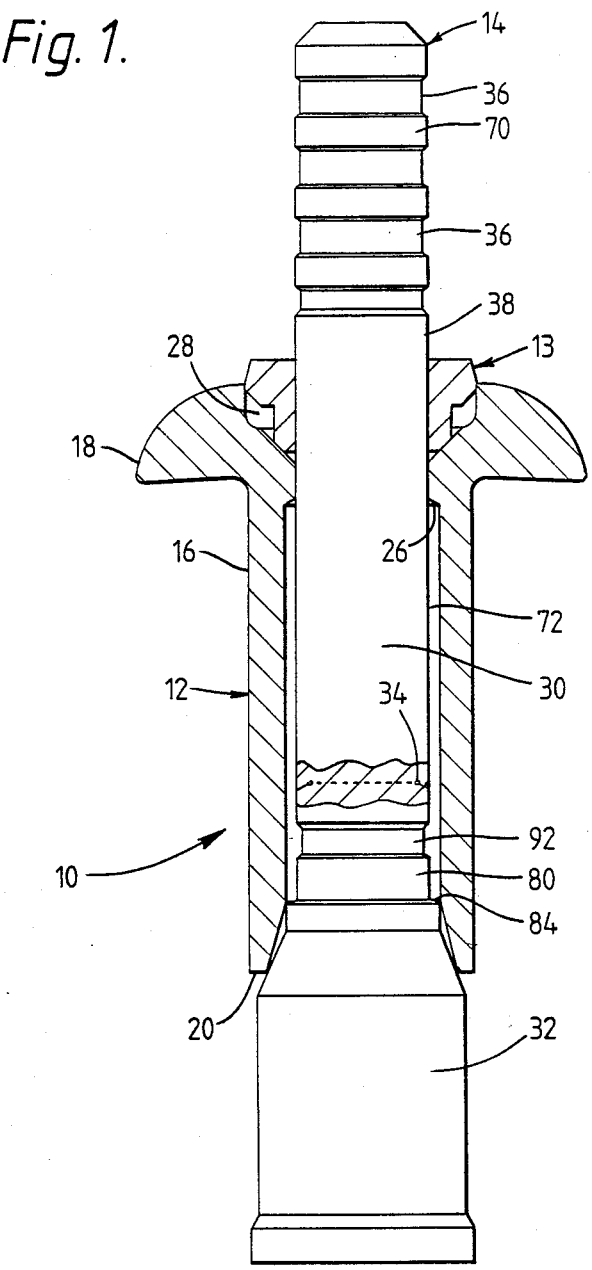
FIG. 1 is an elevational view, partly in section, of a self-plugging blind fastener according to the invention, assembled and ready for use.
Figure 2:
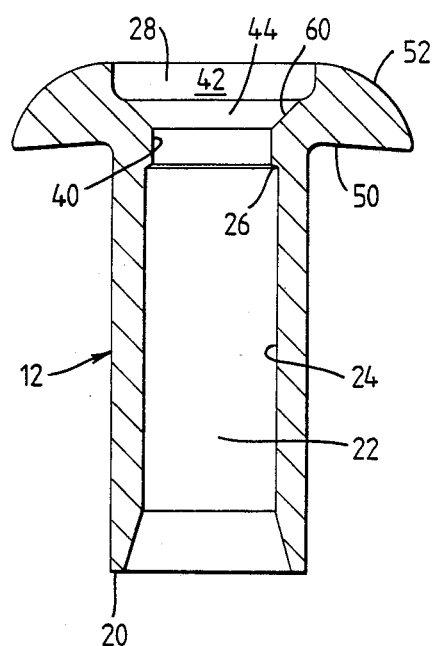
FIGS. 2, 3 and 4 are side elevations of parts of the fastener of FIG. 1 in separated relationship, FIG. 2 showing a body partly in section, FIG. 3 showing a locking collar, and FIG. 4 showing a fragment, partly in section, of a stem.

Refering to the drawings, a self-plugging blind fastener 10 comprises a tubular body 12, an annular locking collar 13, and an elongate stem 14 which, prior to use of the fastener and usually during its manufacture, are assembled together to form a unitary structure ready for installation in a workpiece, as shown in FIG. 1.

The body 12 is formed of tempered steel of moderate hardness, and has an elongate shank 16 and a radially enlarged preformed head 18 formed integrally with the shank at one end (the "head end") of the body. The other end of the body is hereinafter referred to as the "blind end", and is indicated by the reference 20.

A bore 22 extends axially, through the head 18 and the shank 16, throughout the length of the body 12. The bore 22 is radially enlarged within the shank 16 by a counterbore 24. The counterbore 24 extends from the blind end 20 towards the head 18, and terminates at a position which, in this embodiment, is within the shank and near to the head 18, to provide an annular stop face 26 facing towards the blind end 20.

The counterbore 24 is slightly flared adjacent the blind end 20, to provide a lead-in.

The bore 22 is also radially enlarged at the head end, providing an annular recess 28 which extends axially into the head 18 from the head end of the body, for receiving the locking collar 13 as will be explained subsequently.

The fastener 10 of this embodiment is of the "breakstem" type. The stem 14 is formed of tempered steel harder than that of the body, and comprises two principal parts, namely an elongate stem-tail 30, and a plug 32 which is integrally connected to the stem-tail by a concealed narrow breakneck 34. The breakneck 34 is made the weakest part of the stem 14 so that, when the stem is subjected to a predetermined axial tension, it will break at the breakneck rather than elsewhere. More particularly, the fastener 10 is of the type in which the plug can be pulled into the bore of the body at the blind end so as to radially expand a part of the shank adjacent to the blind end, and thereby form a blind head remote from the preformed head 18. In other embodiments of the invention, however, other arrangements can be adopted for enabling the formation of a blind head during the setting of the fastener as will be understood by those skilled in the art of blind fasteners.

Part of the plug 32 in a region adjacent to the breakneck 34 is of sufficiently small diameter to be able to enter a short distance into the counterbored region of the bore 22 at the tail end of the body, but, in parts more remote from the breakneck, the diameter of the plug becomes substantially greater than that of the counterbore 24, so that it can only enter the bore further by expanding the shank 16 radially.

The stem-tail is of substantially constant diameter, and has a smooth surface throughout most of its length, except that, in order to facilitate gripping and pulling of the stem, a region of the stem-tail adjacent to the end remote from the plug is formed with a plurality of annular pulling grooves 36.

The body 12, collar 13, and stem 14 are assembled together prior to use so that the plug 32 is adjacent to the blind end 20 of the body and only partly within the bore 22, and the stem-tail 30 extends through the bore, and a part 38 of the stem-tail including the grooved region projects from the head end of the body. The annular locking collar 13 is disposed on the projecting part 38, which it frictionally engages, and serves to retain the parts of the fastener in the assembled condition ready for use.

The bore 22 in the body has a short main region 40, between the counterbore 24 and the recess 28, in which the stem-tail 30 forms a light interference fit.

The annular recess 28 has an outer region 42, the diameter of which is substantially greater than that of both the bore 22 and the stem-tail 30, and a tapered inner region 44 spaced from the head end of the body by the outer region 42. The inner region 44 is substantially frusto-conical, and tapers smoothly in the direction away from the head end from a maximum diameter which, in this embodiment, is slightly less than that of the outer region 42, until it merges with the main region 40 of the bore 22 at a position which is within the head 18.

In this embodiment, the head 18 is of the type known as "round head", but the body could be formed with a raised head of a shape other than round, or with a countersunk head instead of a round head.

Thus, the head 18 has a slightly dished underhead surface 50 facing towards the blind end and meeting the shank at a position slightly nearer to the blind end than is the position at which the tapered inner region 44 of the recess meets the main region 40 of the bore, and a convexly curved upper surface 52 facing generally away from the blind end of the body.

The annular locking collar 13 is formed of a material which is relatively more easily deformable than that of the body 12, and in this embodiment is formed of annealed steel, which is malleable.

The locking collar 13 comprises a head portion 54 and a deformable locking portion 56 integral with the head portion, and has a cylindrical bore extending axially through the head portion 54 and locking portion. The diameter of the bore of the collar is similar to that of the main region 40 of the bore of the body, and is such as to enable the collar to fit closely to the surface of the stem-tail, and desirably, as previously indicated, to form a friction fit with the stem-tail, although this is not essential. The locking portion 56 is generally in the form of a hollow cylinder, the external diameter of which is smaller than the maximum diameter of the tapered inner region of the recess, and is bevelled adjacent its free end. The angle of bevelling is similar to the taper angle of the inner region of the recess, and the bevelling presents a bearing surface 58 which is able to seat against that peripheral surface of the body, indicated by the reference 60, which defines the inner region of the recess.

The head portion 54 of the collar 13 has a maximum diameter such as to be able to enter and substantially fill the diameter of the outer region 42 of the recess, and is sufficiently greater, in diameter and mass, than the locking portion 56, to be relatively more resistant to radial deformation than the locking portion. The head portion 54 presents an annular upper surface 62 remote from the locking portion, and an annular underhead surface 64 adjacent to the locking portion. The peripheral surface of the head portion is angled so as to provide an upper part 66 which is slightly tapered towards the upper surface 62, and a relief bevel 68 which tapers towards the underhead surface 64 at an angle of about 45 degrees to the axis of the collar.

The shape and dimensions of the locking collar and the annular recess relative to each other, are not exactly complementary, but are related to each other in a way which enables certain functional requirements to be met, as will be explained subsequently.

The stem of this embodiment is of the type so adapted that, on being pulled to draw the plug 32 further into the bore 22, initially, part of the shank adjacent to the tail end of the body will be radially expanded to form a blind head, and subsequently, the plug may be drawn further along the bore, until the breakneck is substantially flush with the upper surface 52 of the preformed head 18, and, if necessary, or desired, more of the shank may be expanded within a hole of suitable diameter in a workpiece in which the fastener is being installed, so as to fill the hole. In this embodiment, the plug is adapted to undergo wire-drawing so as to be capable of elongating under suitably high tensile stress. Finally, the plug may be locked in position within the bore of the body so as to plug the bore more or less permanently and to resist forces which may tend to drive the plug out of the bore in the direction opposite to that in which it entered. The stem-tail 30 may be removed on fracture of the breakneck 34 after the plug has been locked in position.

Referring again to FIG. 1, the stem-tail 30 has a pulling region 70 adjacent the end remote from the plug 32, in which the several annular pulling grooves 36 are formed, and a collar-supporting part 72.

The collar-supporting part 72 extends to the breakneck 34, and is of such a diameter as to form a close fit in the main region 40 of the bore of the body and in the bore of the locking collar. In this embodiment, the collar-supporting part is of constant diameter throughout its length, but it would be possible for a part of it to be slightly undersize and for it to increase in diameter near the breakneck so as to increasingly interfere with the body in the main region 40 of the bore. The collar-supporting part has a smooth surface which in practice is lubricated so as to be able to support the collar against radially inward deformation, and move through the bore of the collar with little frictional effect, under conditions in which the collar is being forced strongly into engagement with the collar-supporting part.

Figure 4:
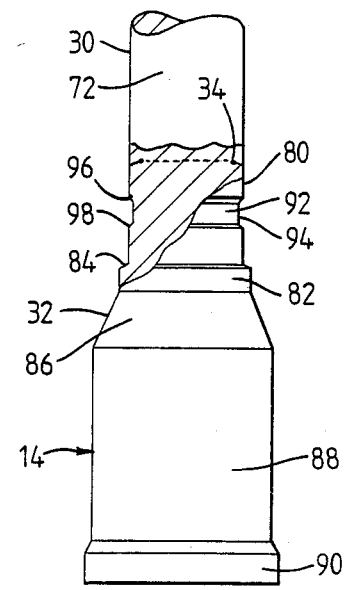
Figure 3:
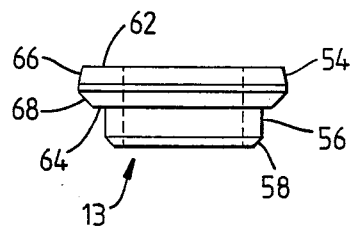

Referring more particularly to FIG. 4, the plug 32 has a shaft portion 80 adjacent to the breakneck 34, and then increases in diameter to present a land 82, and a stop face 84 between the land and the shaft portion. The diameter of the plug then increases away from the breakneck, through a frusto-conical portion 86, to a diameter substantially greater than that of the counter-bore 24, providing an enlarged cylindrical main portion 88. The plug terminates, at the end remote from the breakneck, in a radially enlarged annular rib 90.

An axial cavity (shown only in FIG. 7) extends from the annularly ribbed end of the plug through the main portion 88 and into the frusto-conical portion 86, thereby facilitating wire drawing under tensile stress of the portions of the plug which are traversed by the cavity.

The shaft portion 80 generally has a diameter the same as that of the collar-supporting part 72, but is formed with an annular locking groove 92 between its ends.

The locking groove 92 is wide and shallow, and is of substantially U-shape, having a substantially cylindrical root 94 between two, spaced, flanks. The flank of the groove which is nearer the breakneck constitutes a locking face 96, and the flank remote from the breakneck constitutes a reaction face 98 which extends substantially at right angles to the axis of the stem.

The locking face 96 is substantially frusto-conical, having an included angle of taper of about 100 degrees which is made slightly greater than that of the peripheral surface 60, in order to avoid the face 96 being either parallel to the surface 60, or so inclined to the surface 60 that the distance between the locking face 96 and the surface 60 decreases towards the root 94 of the locking groove 92.

The axial length of the shaft portion 80 is substantially the same as (but not greater than) the distance between the stop face 26 in the bore 22 and the head end of the body. The locking groove 92 is spaced from the stop face 84 by a distance substantially equal to (but not greater than) the distance between the stop face 26 and the axially inner end of the recess 28.

The stop faces 26 and 84 together constitute means for arresting the movement of the plug through the bore of the body. Thus, when the stem is pulled to draw the plug in the direction from the tail end of the shank towards the preformed head, a blind head is formed, and subsequently the stop faces 26 and 84 come into abutment and arrest further movement of the plug relative to the body.

The dimensions and disposition of the various parts are such that, when the two stop faces abut each other, the breakneck 34 will be aligned with, or slightly below, the upper surface 52 at the head end of the body, and the locking groove 92 will be in register with the inner region 44 of the recess 28, with the reaction face 98 substantially aligned with (but not nearer to the head end than) the point at which the tapered inner region 44 merges with the main region 40 of the bore of the body.

As previously mentioned, the breakneck 34 is concealed. Thus, the breakneck lies at the root of a peripheral groove which is overhung by lips formed on the adjacent collar-supporting part 72 of the stem-tail, and the shaft portion 80 of the plug respectively, the lip on the collar-supporting part 72 overlapping that on the shaft portion so as to enclose the groove, thereby concealing the breakneck, and serving to prevent ingress of materials into the groove.

Further details of the construction of the fastener 10 will become apparent from the following description, by way of example, of the manner in which the fastener may be used to fasten members together.

Referring now to FIG. 5, apertured workpiece members 100, 102 to be fastened are brought together with their apertures in register, and the assembled fastener 10 is inserted into the registering apertures so that the underhead surface 50 of the preformed head 18 abuts the near face of the member 100, and the shank of the body extends through both members and projects beyond the opposite, or "blind" face of the member 102.

The fastener is then set by means of a suitable setting tool represented in the drawings by only an annular anvil 104, and a pair gripping and pulling jaws 106 which are reciprocable relative to the anvil.

The anvil 104 has an annular flat face 108 with a central aperture through which the projecting part 38 of the stem of the fastener can be passed into engagement with the jaws 106. The diameter of the face of the anvil is greater than that of the upper surface 62 of the locking collar, but need not be as great as the diameter of the preformed head 18 of the body.

The diameter of the central aperture of the anvil is sufficiently great to allow passage of the stem-tail, but preferably is not greater than the diameter of the bore of the locking collar.

Either before, or after insertion of the fastener into the apertures of the workpiece members, the projecting part 38 of the stem-tail 30 is inserted through the central aperture of the anvil and into engagement with the jaws 106. The tool is then actuated to grip and pull the stem-tail further into the tool through the anvil, thereby causing the face 108 of the anvil to apply a reaction force to the upper surface 62 of the head portion of the collar. This reaction force is in turn transmitted to the body 12 of the fastener through the bearing surface 58 of the collar which is forced into engagement with the surface 60 peripherally of the tapered inner region 44 of the recess 28. Thus the anvil supports the body 12.

In this embodiment, the included angle of taper of the inner region 44 of the recess is 90 degrees, giving a suitable compromise between transmitting all of the axially applied reaction force to the body, and translating the axial force into a radially inwardly directed force whereby the deformable part of the collar can be deformed radially inwardly. However, the required taper angle will depend on a number of factors, in particular the hardness of the material of the collar, and can be determined empirically.

As the body is supported by the anvil, the plug 32 is drawn further into the counterbore, progressively expanding the shank radially to form a blind head 110 which engages the blind member 102 of the workpiece and, in cooperation with the preformed head, fastens the two members 100, 102 together.

Initially during this movement, the force applied to the collar 13 drives the collar further into the recess, causing some deformation of the deformable locking portion 56 which then becomes supported by both the collar-supporting part 72 of the stem-tail and the peripheral surface 60 of the body. Eventually however, a balance is established between the tendency for the collar to deform further, and the tendency for the plug to undergo wiredrawing and become elongated. As the head portion 54 of the collar is of greater diameter and mass than the locking portion 56, the head portion 54 is not appreciably deformed at this stage.

Continued pulling of the stem draws the shaft portion 80 of the plug nearer to the head end of the body, so that the locking groove begins to come into register with the tapered inner region of the recess just before the stop faces 26 and 84 abut each other. The deformable portion of the collar then lacks the support of the collar-supporting part of the stem and the shaft portion 80 of the plug, and then begins again to be deformed, and enters the locking groove as shown in FIG. 6. However, the plug continues either to move, or to elongate, until the stop faces eventually abut each other, at which stage the locking groove is fully in register with the recess, and the reaction face 98 is at, or nearly at, the junction of the recess 28 and the main region 40 of the bore.

As soon as the stop faces abut each other, the force required to move, or wire-draw, the plug increases substantially, and consequently the increased reaction force between the peripheral surface 60 and the deformable portion causes the deformable portion to enter more fully into the locking groove.

The reaction face 98 lies at an angle, relative to the peripheral surface 60, which is appreciably greater than 90 degrees, and this ensures that when material of the collar moves parallel to the surface 60 and then meets the reaction face, it is then deflected radially inwardly towards the root of the locking groove.

In particular, it is believed that the leading end of the deformable portion comes into abutment with the reaction face 98 of the locking groove, and material behind the leading end of the deformable portion becomes plastic, the plastic material then flowing into the groove 92 and back-filling it in the direction from the reaction face towards the locking face 96, so that eventually material of the deformable portion becomes packed between the locking face 96 of the groove and the peripheral surface 60 of the body, and is therefore able to oppose regressive movement of the plug within the body.

During this deformation, the head portion 54 of the collar is able to enter further into the outer region 42 of the recess under the urging of the face 108 of the anvil, until eventually the face 108 brings the upper surface 62 into register with the upper surface 52 of the preformed head, and itself engages the upper surface of the preformed head.

At this stage, with the anvil face 104 abutting the preformed head, the force required to produce further relative movement between the anvil face 108 and the stem-tail again increases. With the tool applying increasing force, this results in fracture of the breakneck, allowing the stem-tail to be discarded, and leaving the fastener set, with the plug locked in the body.

It will be appreciated that, while initially the deformation of the collar is by extrusion between the peripheral surface of the body, and the collar-supporting part of the stem, the final deformation occurs as a result of the collar being crushed between the anvil and the reaction face 98 of the stem.

In order to ensure that the upper surfaces 52 and 62 can always be brought into register, and thus avoid unevenness at the head of the set fastener despite dimensional variations within manufacturing tolerances, the shape and dimensions of the collar and the recess are so related that, when the collar is entered into the recess so that its upper surface 62 registers with the upper surface 52, and the locking groove has been substantially filled by material of the deformable locking portion 56, there remains a void 120 between the underhead surface 64 of the head portion of the collar and the surface 60 peripherally of the recess, as can be seen in FIG. 7. Thus, the void is available to accommodate additional material of the collar should the need arise as a result of, for example variation in dimensions, within predetermined tolerances, of the various parts and features of the fastener.

More particularly, the shape and dimensions of the locking collar, and in particular those of the locking portion, are made such that, on applying a force to the upper surface of the collar so as to force the collar more fully into the recess, the deformable portion will continue to enter the inner region of the recess, and be deformed thereby so as to substantially fill the locking groove before the upper surface of the collar becomes flush with the upper surface of the preformed head.

Although the invention has been described in the context of locking means applied to a selfplugging blind fastener of the kind in which a blind head can be formed by pulling a radially enlarged part of the plug into the bore, and thereby radially expanding the shank, the invention can also be applied to self-plugging blind fasteners in which other means for forming a blind head are provided. Thus, for example, a blind head can be formed by causing axial collapse of the shank to produce an annular fold of larger diameter than that of the shank before folding. Such alternatives are well known in the art of blind fastening, and appropriate constructions, and modifications of the preferred structures described herein, will be readily apparent to those skilled in the art.

We claim:

1. A self-plugging blind fastener comprising a tubular body, an elongate stem, and an annular locking collar, the tubular body having an elongate shank and a preformed radially enlarged head at one end f the shank, the stem being disposed within the bore of the tubular body and having a plug part having an annular locking groove, and a tail part which projects from the head end of the body and whereby the plug part can be pulled, and moved relative to the body in the direction from the shank towards the preformed head, to cause the formation of a blind head remote from the preformed head, the bore of the body being radially enlarged at the head end to provide an annular recess which extends peripherally of the stem and axially into the head from the head end of the body, and having a main region spaced from the head end of the body by the recess, the recess having an outer region having a diameter substantially greater than that of the main region of the bore, and a tapered inner region in which the diameter of the recess reduces away from the outer region, to a diameter the same as that of the main region of the bore, the fastener having means for arresting the movement of the plug part through the body in the said direction after formation of a blind head, the annular locking collar being disposed on the projecting tail part of the stem, and having a volume smaller than the combined volumes of the recess and the locking groove, the locking collar comprising a deformable locking portion and a radially enlarged load-bearing head portion, the locking portion having a volume greater than that of the locking groove and being deformable radially inwardly, on being forced into the inner region of the recess, so as to enter the locking groove, the head portion having a volume less than that of the outer region of the recess, and an external diameter greater than that of the locking portion but such as to be capable of entering the outer region of the recess, the stem having a collar-supporting part between the locking groove and the projecting part, the collar-supporting part fitting closely to the walls of the main region of the bore of the body and the bore of the collar, and the angle of taper of the inner region of the recess being sufficiently great to resist, in cooperation with the collar-supporting part of the stem, the entry of at least part of the deformable locking portion into the inner region of the recess when the locking collar is subjected to a force sufficient to move the plug in the said direction while causing the formation of a blind head, but sufficiently small to allow the locking portion to enter more fully into the inner region, and to be deformed thereby when the locking collar is subjected to an increasing force after movement of the plug relative to the body has been arrested by the arresting means, the arresting means being arranged to positively arrest the movement of the plug in the said direction as soon as substantially all of the locking groove comes into register with the annular recess, and thus allow the application to the locking collar of an increasing force, whereby the locking collar can be caused to enter more fully into the recess and be deformed thereby so as to enter the locking groove.

2. A self-plugging blind fastener as claimed in claim 1, wherein the tapered inner region of the recess has a maximum diameter less than the diameter of the outer region.

3. A self-plugging blind fastener as claimed in claim 1, wherein the inner region of the recess merges with the main region of the bore at a position which is within the head.

4. A self-plugging blind fastener as claimed in claim 1, wherein the head portion of the locking collar has a volume smaller than that of the outer region of the recess.

5. A self-plugging blind fastener as claimed in claim 1, wherein the locking portion of the collar has a volume greater than the total volumes of the locking groove and the inner region of the recess.

6. A self-plugging blind fastener as claimed in claim 1, wherein the locking collar has a volume smaller than the total volumes of the recess and the locking groove.

7. A self-plugging blind fastener as claimed in claim 1, wherein the locking groove is of substantially U-shape, presenting axially spaced flanks, the flank more remote from the tail part of the stem constituting the reaction face, and the flank nearer the tail part constituting the locking face.

8. A self-plugging blind fastener as claimed in claim 7, wherein the reaction face lies at an angle, relative to that peripheral surface of the body which defines the inner region of the recess, which is greater than 90 degrees.

9. A self-plugging blind fastener as claimed in claim 7, wherein the reaction face lies substantially at right angles to the axis of the stem.

10. A self-plugging blind fastener as claimed in claim 7, wherein the locking face is of frusto-conical shape, and tapers at an included angle greater than that of the inner region of the annular recess.

11. A self-plugging blind fastener as claimed in claim 7, wherein the locking groove has a substantially cylindrical root between the flanks.

12. A self-plugging blind fastener as claimed in claim 1, wherein the means for arresting movement of the plug part through the body comprises a stop face in the bore of the body and a stop face on the plug.

13. A self-plugging blind fastener as claimed in claim 12, wherein the distance between the locking groove and the stop face of the stem is substantially equal to, but not greater than, the distance between the point at which the tapered inner region of the recess merges with the bore, and the stop face of the body.

14. A self-plugging blind fastener as claimed in claim 13, wherein the stop face of the body is positioned within the shank and near to the head.

15. A self-plugging blind fastener as claimed in claim 1, wherein the locking portion of the locking collar is in the form of a hollow cylinder having an external diameter smaller than the maximum diameter of the tapered inner region of the recess.

16. A self-plugging blind fastener as claimed in claim 15, wherein the locking portion is bevelled to present a bearing surface able to seat against the peripheral surface defining the inner region of the recess.

17. A self-plugging blind fastener as claimed in claim 1, wherein the locking collar is formed of a material which is relatively more easily deformable than that of the body.

18. A self-plugging blind fastener as claimed in claim 1, wherein the locking groove presents a locking face which converges, in the direction away from the axis of the stem, towards that peripheral surface of the body which defines the inner region of the annular recess.

* * * * *